United States Patent [19]

May et al.

[11] Patent Number: 4,508,444
[45] Date of Patent: Apr. 2, 1985

[54] MULTIMODE DOCUMENT HANDLING APPARATUS AND REPRODUCING APPARATUS CONTAINING SAME

[75] Inventors: Joseph N. May, Fairport; Joseph M. Wing, Ontario, both of N.Y.

[73] Assignee: Xerox Corporation, Stamford, Conn.

[21] Appl. No.: 403,602

[22] Filed: Aug. 2, 1982

[51] Int. Cl.³ .................. B65H 5/06; B65H 9/06; B65H 3/44; B65H 5/02
[52] U.S. Cl. .................. 355/3 R; 355/3 SH; 355/14 R; 355/14 SH; 355/51; 271/4; 271/9; 271/10; 271/65
[58] Field of Search ............. 355/3 R, 1, 3 SH, 14 R, 355/14 SH, 8, 10, 51, 9, 11, 23, 24, 25, 26; 271/4, 9, 10, 65, 258, 259

[56] References Cited

U.S. PATENT DOCUMENTS

| | | | |
|---|---|---|---|
| 3,510,218 | 5/1970 | Limberger et al. | 355/51 |
| 3,575,503 | 4/1971 | Van Auken et al. | 355/8 |
| 3,658,407 | 4/1972 | Kitano et al. | 355/1 X |
| 3,834,805 | 9/1974 | Griffin, Jr. | 355/8 |
| 4,025,187 | 5/1977 | Taylor et al. | 271/10 X |
| 4,062,533 | 12/1977 | Greenberg et al. | 271/10 |
| 4,170,414 | 10/1979 | Hubert et al. | 355/14 |
| 4,218,128 | 8/1980 | Satomi et al. | 355/14 SH |
| 4,235,431 | 11/1980 | Abrams et al. | 271/10 |
| 4,248,415 | 2/1981 | Steinhilber | 271/10 X |
| 4,444,382 | 4/1984 | Ishikawa et al. | 271/10 |

FOREIGN PATENT DOCUMENTS

| | | | |
|---|---|---|---|
| 51628 | 3/1982 | Japan | 271/10 |
| 72981 | 3/1983 | Japan | 271/10 |

OTHER PUBLICATIONS

IBM Technical Disclosure, "Automatic Document Feeder Prefeed", D. J. Conly, vol. 25, No. 1, 6/82.
IBM Technical Disclosure, "Single Sheet Paper Feed", R. T. Albo, vol. 8, No. 10, 3/66.

Primary Examiner—A. T. Grimley
Assistant Examiner—Terry Flower

[57] ABSTRACT

A multimode document handling apparatus and reproducing apparatus containing same are described wherein the document handling apparatus comprises an upper frame portion pivotally mounted along its rear edge to a lower base frame portion to provide open and closed positions of the upper frame relative to the lower frame. The lower frame contains a substantially horizontal imaging platen and document transport defining a generally horizontal document transport path. The upper portion contains a vertically inclined document loading chute the lower exit portion of which intersects the generally horizontal document transport path. The document loading chute includes a gate to permit loading of successive copies in the chute while preventing it from being fed as the preceding document is being copied. The device makes single copies by inserting a document into the chute and multiple copies by reversing the direction of the transport rolls to drive the document after having once been copied back across the platen in the horizontal path past the exit portion of the chute to be transported forward again across the imaging platen. At the same time in this multicopy mode the chute can be used as a wait station for insertion of the next document to be copied. The chute is also used as a wait station during the stream feeding of successive documents. To copy pages of a book, the upper frame portion is pivoted up and the book is placed on the transport rolls which transport it across the imaging platen.

23 Claims, 8 Drawing Figures

MULTIMODE DOCUMENT HANDLING APPARATUS AND REPRODUCING APPARATUS CONTAINING SAME

REFERENCE TO RELATED APPLICATIONS

Reference is hereby made to copending application Ser. No. 403,594 entitled Sheet Feeder with Retractable Gate filed concurrently herewith in the name of Joseph N. May.

BACKGROUND OF THE INVENTION

This invention relates to multimode document handling apparatus and automatic reproducing apparatus containing such document handling apparatus. In particular, the present invention relates to document handling apparatus having capability of placing a document on an imaging platen for single copy copying, multicopy copying, stream feeding of original documents, as well as book copying capabilities.

In the electrostatographic reproducing apparatus commonly in use today, a photoconductive insulating member is typically charged to uniform potential and thereafter exposed to a light image of an original document to be reproduced. The exposure discharges the photoconductive insulating surface in exposed background areas and creates an electrostatic latent image on the member which corresponds to the image areas contained within the usual document. Subsequently, the electrostatic latent image on the photoconductive insulating layer is made visible by developing the image with developing powder referred to in the art as toner. Most development systems employ development material which comprise both charged carrier particles and charged toner particles which triboelectrically adhere to the carrier particles. During development, the toner particles are attracted from the carrier particles by the charged pattern of the image areas on the photoconductive insulating area to form a powder image on the photoconductor. This may subsequently be transferred to a support surface such as copy paper to which it may be permanently affixed by heating or by the application of pressure.

While the processing of the electrostatic latent image on the photoconductive insulating layer may be the same for each copy produced, it is often desirable to have different capabilities in terms of copying different types of documents, such as sheets or books, of providing multicopies of documents or of being able to quickly provide a copy of a collated set. Many commercial machines provide multimode capability through the use of a moving document platen which is reciprocated back and forth across the imaging platen to make one or more multiple copies. Book copying capability is also available in such devices merely by placing a book on the moving platen. Moving platen machines suffer from the deficiency in that they are not capable of stream feeding documents and therefore an inordinate length of time is necessary to copy a multi page document, for example, since for each copy the platen must be manually loaded, transported back and forth across the imaging platen and the document manually removed before the next document may be placed on the platen. In addition, moving platen machines typically take up a relatively large floor area since the moving platen frequently extends beyond the frame of the machine. Furthermore, a safety hazzard may potentially arise with the moving platen machines since the platens are driven beyond the frame of the machine in that the operator or passerby may be struck by this moving apparatus.

Stationary platen moving optics machines are also available commercially. The Xerox 3100 family of products are exemplary. In the Xerox 3107, for example, a document may be fed to the stationary platen where it is scanned with a moving optical system. In small copiers moving optical systems are comparatively expensive and take up a relatively large volume of sapce, thereby increasing the perceived size of the machine. In addition, while the Xerox 3107 is capable of stream feeding, it is possible for the operator to place the second document in the document feeder too soon after the first document has been placed thereby overlapping the documents.

PRIOR ART

U.S. Pat. No. 3,510,218 (Limberger et al) describes a copier with both document and book scanning capability. This apparatus has a series of transport rollers built into a copier, each associated with a counter pressure roller in the platen cover. Each copy appears to be made in a forward pass through the document transport. There appears to be no reversing mechanism for making multiple copies since transport rollers 32 through 35 are driven only in a clockwise direction. It provides a multimode document handling capability in that it has a transparent platform carrier for transporting a book across the imaging platen. Furthermore, the platen cover is hinged at the rear. In addition to lacking any apparent teaching of a multi copy reversing mechanism, this apparatus does not appear to provide a stream feeding capability.

U.S. Pat. No. 4,170,414 (Hubert et al) describes a copier with an inclined document chute and an aligner wheel sheet entry gate. The gate is lowered and a document drive belt drives the document onto the platen where multiple copies can be made. There does not appear to be any reversing mechanism for making multiple copies of a document. It further appears that either a moving optical system or full frame exposure is provided.

SUMMARY OF THE INVENTION

In accordance with the present invention, a multimode document handling apparatus and a reproducing apparatus containing same are provided. In particular, multimode document handling apparatus having capability for feeding sheets to an imaging platen in an automatic reproducing device wherein single copies may be made, multiple copies may be made, single sheets may be stream fed, or a book may be transported across the imaging platen are provided. In particular, the multimode document handling apparatus and reproducing apparatus containing same comprise a upper frame portion pivotally mounted along its rear edge to a lower base frame to provide open and closed positions of the top frame relative to the lower frame. The lower frame contains a substantially horizontal imaging platen and document transport means such as driven rolls, and defines a generally horizontal document transport path. The top portion contains an inclined document loading chute, the lower exit portion of which intersects the generally horizontal document transport path. The document loading chute includes a gate means to prevent loading of successive copies in the chute while preventing it from being fed as the preceding document is being copied. The device makes single copies by inserting a document into the chute and multiple copies by reversing the direction of the transport rolls to drive the document after having been copied once back across the platen in the horizontal path past the exit portion of the chute to be transported forward again across the imaging platen to make a subsequent copy. At the same time in this multi copy mode, the chute can be used as a wait station for the insertion of the next document to be copied, or in a stream feeding operation as the wait station for the next successive sheet to be copied. To copy pages of a book, the top frame portion is pivoted up and the book is placed on the transport rolls which transport the book across the imaging platen.

In a specific aspect of the present invention a very convenient device with the stream feeding of successive documents without a subsequent document overlapping a previous document is provided.

In a further aspect of the present invention, the drive means comprises a plurality of drivable transport rolls in the plane defined by the substantially horizontal imaging platen which are in operative communication with idler rolls in the upper frame member.

In a further aspect of the present invention, the exit portion of the inclined chute intersects the platen transport plane upstream of the transport rolls on the upstream side of the imaging platen.

In a further aspect of the present invention, the document handling apparatus comprises a side registration aid comprising a driver roll, the top of which is in the plane of the chute which is engagable with a top idler ball to form a nip through which a sheet may be fed and side registered. The driver roll is inclined to the general direction of travel of a sheet to thereby drive the rear edge of a sheet against a registration edge.

In an additional aspect of the present invention, means to retract the gate from the path of the sheet being fed in the chute simultaneously with engaging the top ball of the registration aid with the driver roll are provided.

In a further aspect of the present invention, a start sensor is provided in the inclined chute upstream of the registration aid which is activated by a sheet fed into the chute and in turn, activates the registration aid drive roll.

Accordingly it is an object of the present invention to provide an improved multimode document handling apparatus.

It is a further object of the present invention to provide an automatic reproducing apparatus containing a multimode document handling apparatus.

It is a further object of the present invention to provide a multimode reproducing apparatus with improved operator convenience.

It is a further object of the present invention to provide a reproducing apparatus capable of rapidly producing copies of an original document, stream feeding original documents and having the capability of copying pages from books.

It is a further object of the present invention to provide electrostatic reproducing apparatus which is relatively compact, inexpensive to manufacture, and which avoids the safety hazzards apparent in moving platen copier machines.

It is a further object of the present invention to prove a multimode document handling apparatus wherein stream feeding of documents in an efficient manner while minimizing intercopy gap, or interdocument gap may be achieved without overlapping successive documents.

For a better understanding of the invention as well as other objects and further features thereof, reference is had to the following drawings and description.

DESCRIPTION OF PREFERRED EMBODIMENTS

The invention will now be described by reference to a preferred embodiment of the multimode document feeding apparatus.

Figure 1:
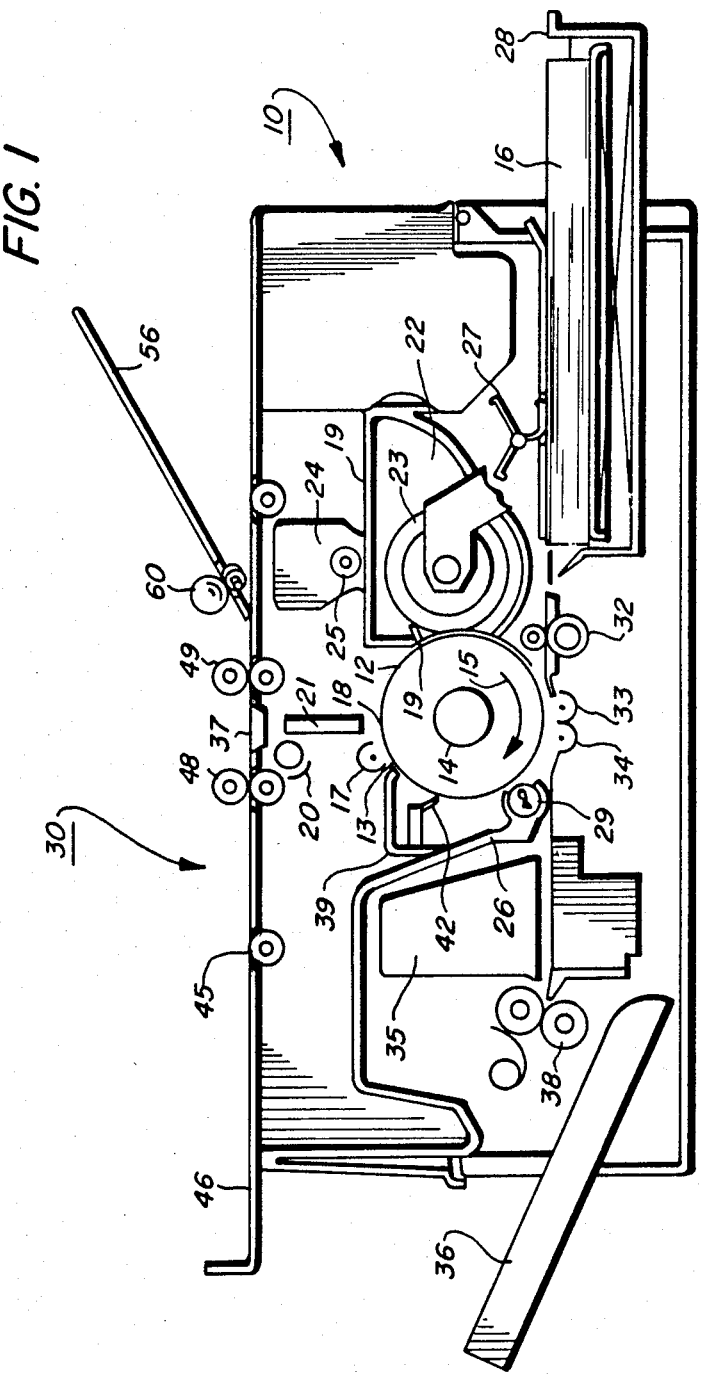
FIG. 1 is a schematic representation in cross section of the operational elements of an automatic reproducing machine incorporating the multimode document handling apparatus of the present invention.

Referring now to FIG. 1 there is shown by way of example the operational element organizational geometry of an automatic xerographic reproducing machine 10 which may use the present invention. The reproducing machine 10 depicted in FIG. 1 illustrates the various operational elements and components utilized for producing copies from an original document. Although the apparatus of the present invention is particularly well adapted for use in an automatic xerographic reproducing machine 10, it should become evident from the following description that it is equally well suited for use in a wide variety of processing systems including other electrostatographic systems and it is not necessarily limited in the application to the particular embodiment or embodiments shown herein.

The reproducing machine 10, illustrated in FIG. 1 employs an image recording drum-like member 12, the outer periphery of which is coated with a suitable photoconductive material 13. The drum 12 is suitably journaled for rotation within a machine frame (not shown in this FIGURE) by means of shaft 14 and rotates in the direction indicated by arrow 15 to bring the image-bearing surface 13 thereon past a plurality of xerographic processing stations. Suitable drive means (not shown) are provided to power and coordinate the motion of the various cooperating machine components whereby a faithful reproduction of the original input scene information is recorded upon a sheet of final support material 16 such as paper or the like.

Initially, the drum 12 moves the photoconductive surface 13 through a charging station 17 where an electrostatic charge is placed uniformly over the photoconductive surface 13 in known manner preparatory to imaging. Thereafter, the drum 12 is rotated to exposure station 18 where the charged photoconductive surface 13 is exposed to a light image of the original input scene information whereby the charge is selectively dissipated in the light exposed regions to record the original input scene in the form of an electrostatic latent image. At the exposure station, the image received on the drum is one which is formed by illuminating the document by exposure lamp 20 and transmitting the image through lens assembly 21 to the photoconductive surface. The lens assembly 21 comprises a bundled array of gradient index optical fibers which are produced under the trade name "SELFOC" in Japan by Nippon Sheet Glass Co., Ltd. and which are described in U.S. Pat. No. 3,658,407 to Kitano et al. After exposure, drum 12 rotates the electrostatic latent image recorded on the photoconductive surface 13 to development station 19 wherein a conventional developer mix is applied to the photoconductive surface of the drum 12 rendering the latent image visible. Typically a suitable development station could include a developer housing 22, a magnetic brush development roll 23 utilizing a magnetizable developer mix having coarse ferromagnetic carrier granules and toner colorant particles which is dispensed from dispenser 24 by dispenser roll 25.

Sheets 16 of the final support material are supported in a stack arrangement on an elevating stack support tray 28. With the stack at its elevated position a sheet separator paddle wheel feeder 27 feeds individual sheets therefrom to the registration system 32. The sheet is then forwarded to the transfer station 33 in proper registration with the image on the drum. The developed image on the photoconductive surface 13 is brought into contact with the sheet 16 of final support material within the transfer station 33 and the toner image is transferred from the photoconductive surface 13 to the contacting side of the final support sheet 16. Following transfer of the image the final support material which may be paper, plastic, etc,, as desired is transported through detack station where detack corotron 34 uniformily charges the support material to separate it from the drum 12.

After the toner image has been transferred to the sheet of final support material 16 the sheet with the image thereon is advanced to a suitable fuser 35 which coalesces the transferred powder image thereto. After the fusing process the sheet 16 is advanced to a suitable output device such as tray 36 by output rolls 38.

Although a preponderance of toner powder is transferred to the final support material 16, invariably some residual toner remains on the photoconductive surface 13 after the transfer of toner powder image to the final support material. The residual toner particles remaining on the photoconductive surface 13 after the transfer operation are removed from the drum 12 as it moves through a cleaning station 39 which includes cleaner housing 26 and auger 29. The toner particles may be mechanically cleaned from the photoconductive surface 13 by any conventional means as, for example, by the use of a cleaning blade 42.

As will be described in greater detail hereinafter, as the document is transported past the optical system, the copy sheet is delivered to the transfer station at the same speed so that a faithful reproduction may be obtained. This is accomplished through the use of a continuously rotating paddle wheel feeder 27 which drives successive sheets from a stack into the registration system 32 which first registers the sheets and then drives them forward at a speed synchronized to that of the document transport.

It is believed that the foregoing general description is sufficient for purposes of the present application to illustrate the general operation of an automatic xerographic copier 10 which can be used in the apparatus in accordance with the present invention.

With continued reference to FIG. 1 and additional reference to FIGS. 2-5, the multimode document handling apparatus 30 will be described in greater detail. As may be observed, with reference to FIG. 3, the document handling apparatus of the present invention has operational components that are contained within an upper frame portion 40 and a lower base frame portion 41. The lower base frame portion also houses the principle components in the reproducing apparatus which was previously described while the upper frame portion comprises the platen cover together with several operational components of the document handler.

Figure 2:
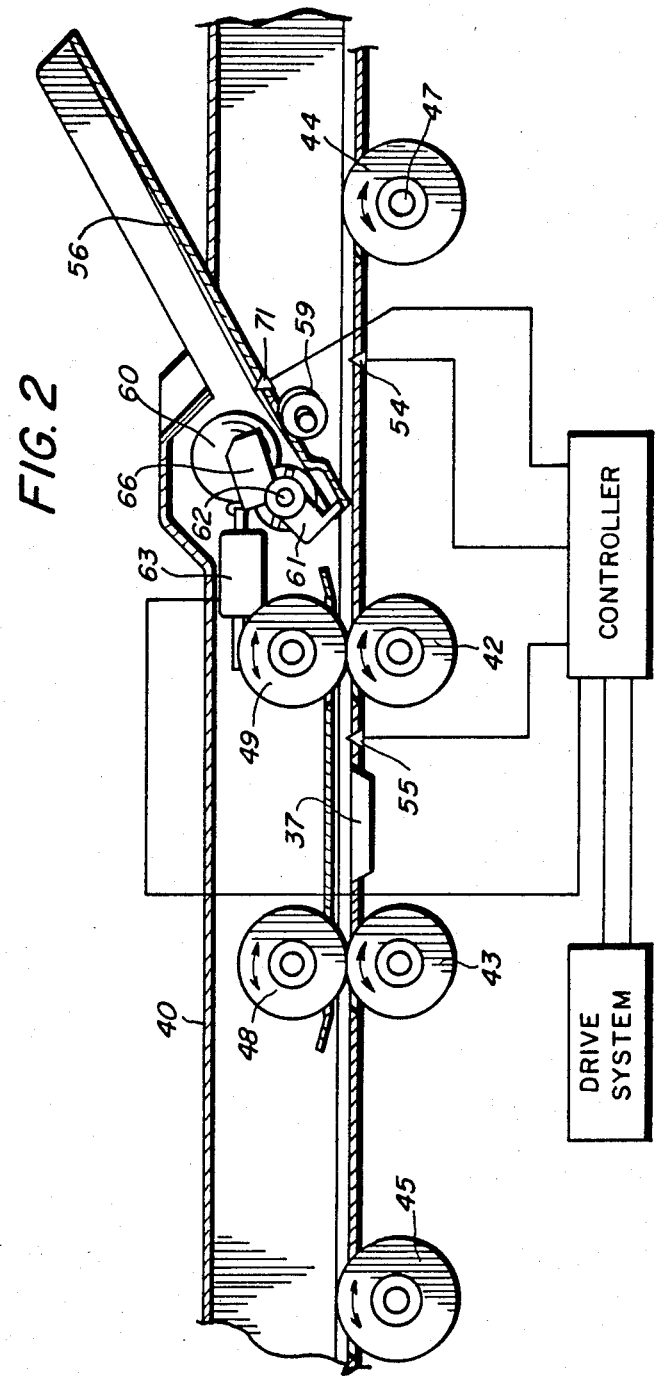
FIG. 2 is an enlarged side sectional view of the document handling apparatus of the present invention.
Figure 3:
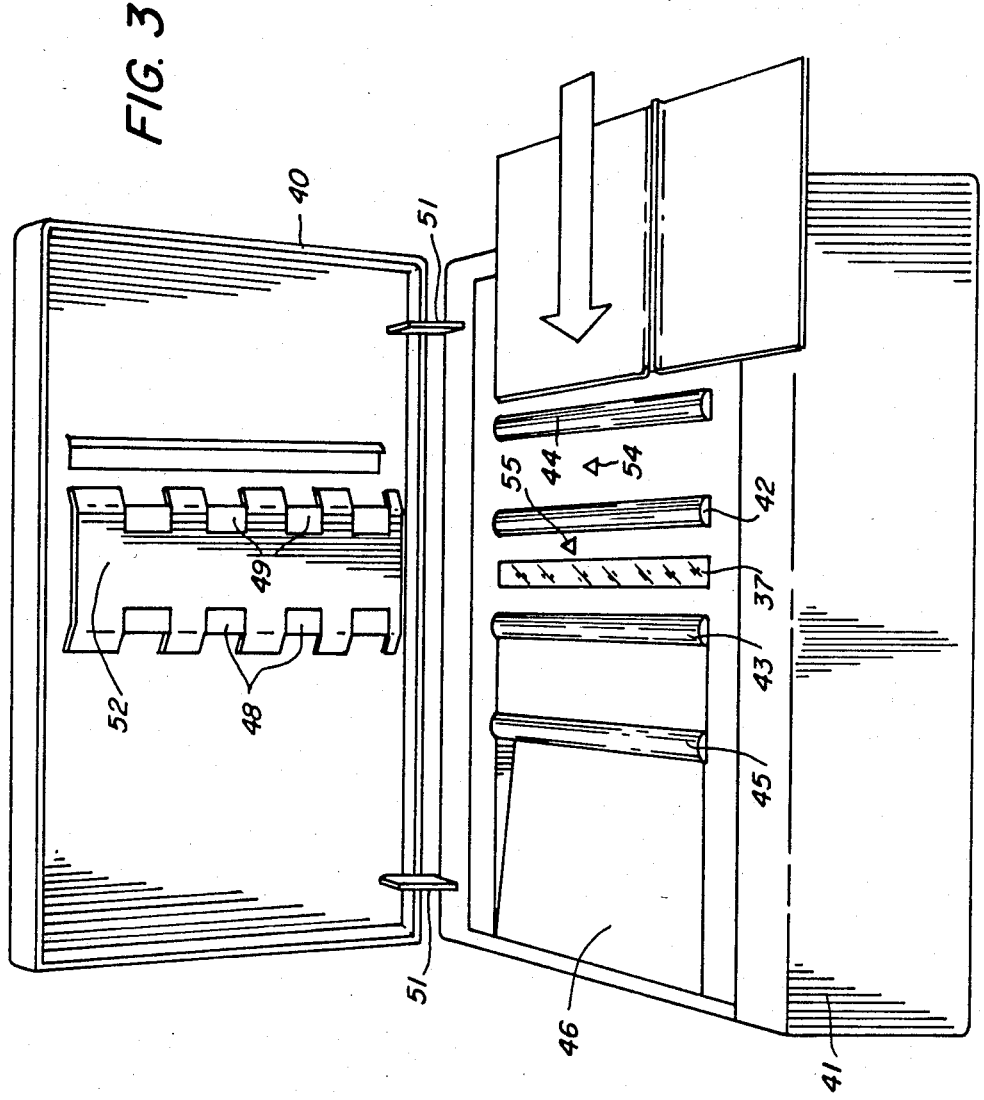
FIG. 3 is an isometric view with the upper frame portion in the up position showing how the drive systems cooperate.

As may be seen with particular reference to FIG. 2, the document transport system provides a multimode capablity. Briefly a document may be loaded in chute 56 transported across imaging platen 37 to make a single copy. If multiple copies are desired the transport rolls 42-44 are reversed and the document is driven straight back across the viewing platen 37 without going up the inclined chute 56. In this way a subsequent document can be loaded in the chute in preparation for copying. If copying from a book is desired, the platen which is hinged at the rear is pivoted up. The book is placed on the roller 44, manually held against the transport rolls which transport the book across the viewing platen 37.

The lower base frame 41 comprises driven transport rolls 42 and 43 on either side of the imaging platen which are capable of being driven in either direction by means not shown. In addition transport roll 44 which is located further upstream of transport roll 42 and the exit of chute 56 in the substantially horizontal path of the transport rolls is also driven in both directions by means not shown. Transport roll 44 however has an overrunning clutch 47 so that it may be manually moved faster in a counterclockwise direction when a book is placed on the roll to be transported to the imaging platen 37. The lower base frame portion also includes a driven exit roll 45 which is also capable of being driven in both directions which drives a copied document into document restack tray 46. The lower base frame portion also includes two sensors to help control the automatic machine. Registration sensor 55, which is positioned upstream of the imaging platen and downstream of the transport roll 42 senses the lead edge of the document being fed to the imaging platen 37 and activates the paddle wheel feeder 27 so that a copy sheet 16 is sycnchronously fed to the imaging drum. In addition sensor 54 which is positioned upstream of the inclined chute exit into the substantially horizontal document path activates the transport rolls when in the book copying mode of operation.

With further reference to the upper frame portion 40 which includes the platen cover is pivotally mounted to the rear edge of the base frame portion at hinges 51 and houses idler rolls 48, 49 which are spring biased into feeding engagement with transport rolls 43 and 42 respectively, to provide a positive drive of the document being copied across the imaging platen 37. A foam pad 52 that floats above the platen in the upper frame portion insures that a document being copied is kept flat on the imaging platen. The document loading chute 56 is vertically inclined to the horizontal and has an exit portion which is in operative communication with the horizontal transport means and intersects the horizontal transport upstream of the first set of transport rolls on the upstream side of the imaging platen. The angle of the chute relative to the substantially horizontal transport plane while not critical should be sufficient to maximize ease of operator loading documents into the chute. Typically this angle is of the order of 15° to 35°. The document loading chute 56 comprises a sheet support bottom 58 having a recessed portion 57 at its exit end which is lower than the level of the sheet support bottom and through which the retractable gate 61 extends when in the closed position.

Figure 4:
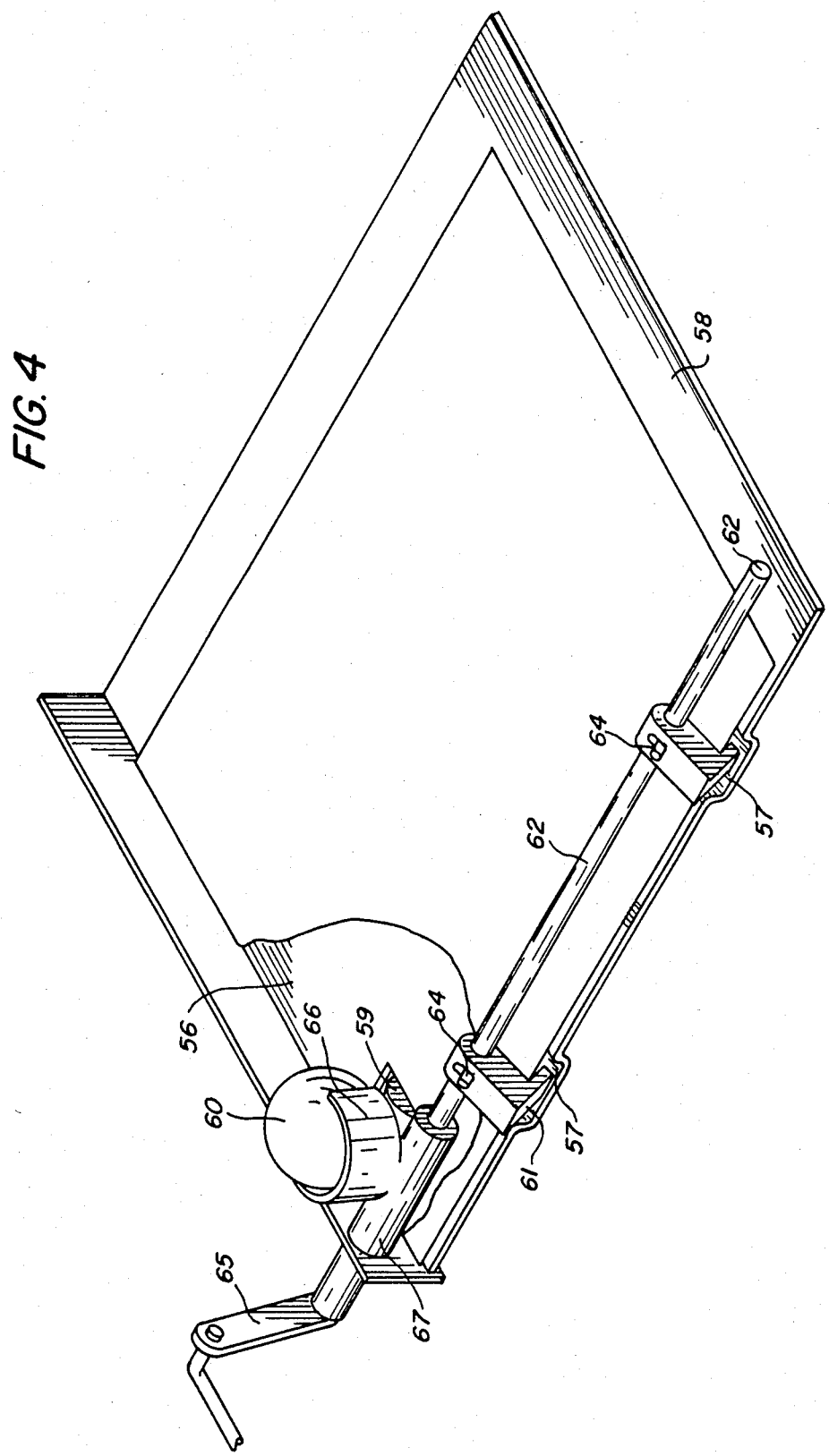
FIG. 4 is an isometric of the document loading chute, registration aid and gate.
Figure 7A:
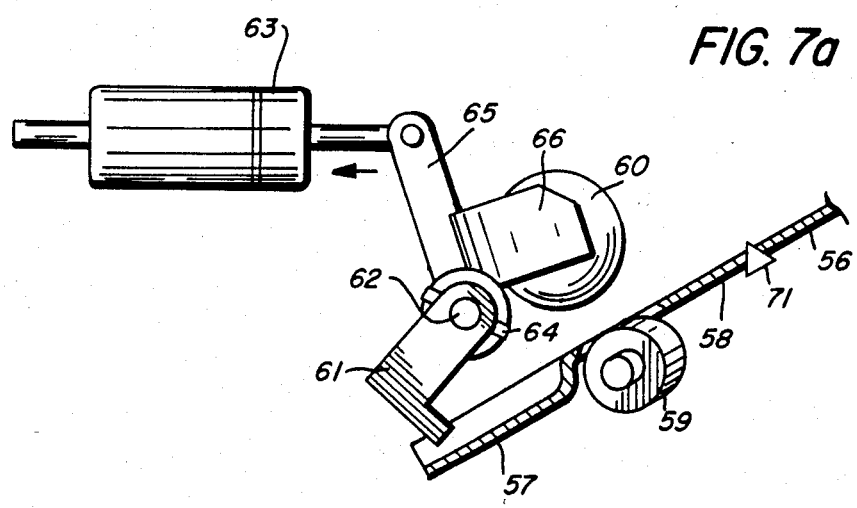
FIG. 7a and 7b are enlarged side views showing the gate in the closed and retracted position respectively.
Figure 7B:
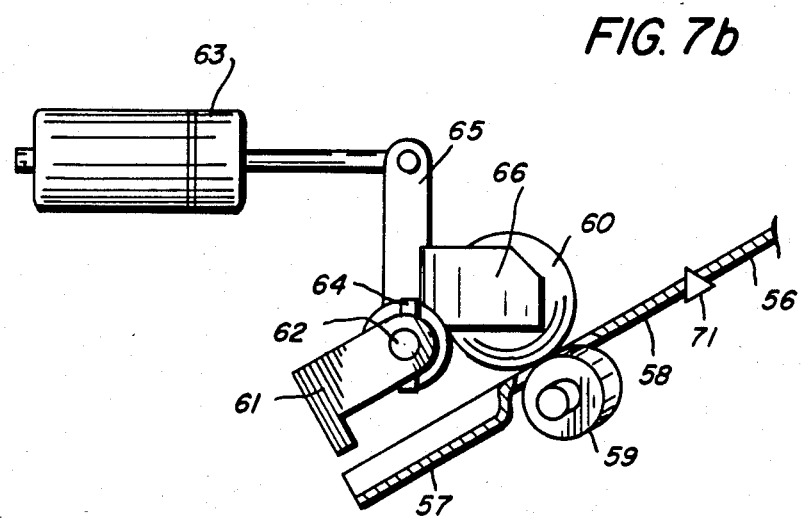

With further reference to FIG. 4 contained in the upper frame portion above the inclined loading chute are a pivotally mounted retractable gate 61 at the exit, a side registration aid comprising a bottom stationary driver roll 59 whose top is in the plane of the sheet support bottom 58 and in pressure contact with idler ball 60 so that when the roll/ball combination is in contact a document therebetween will be fed forward. In addition, this roll/ball combination is positioned to drive a document to the rear of the document handler and register the rear edge along a registration edge not shown. A solenoid 63 (see FIGS. 73 and 76) is connected to gate 61 through gate shaft 62 and linkage 65 and also to supporting cup 66 for registration ball 60 through shaft collar 67. This enables the solenoid to control both gate opening and closing as well as activating and inactivating the side registration aid in that when the gate is open the registration aid is activated by lowering the idler ball into contact with the drive roll and when the gate is in the closed position, the registration aid is inactivated by raising the idler ball from contact with the drive roll. The gate closed and opened positions are illustrated in FIGS. 7a and 7b.

Figure 5:
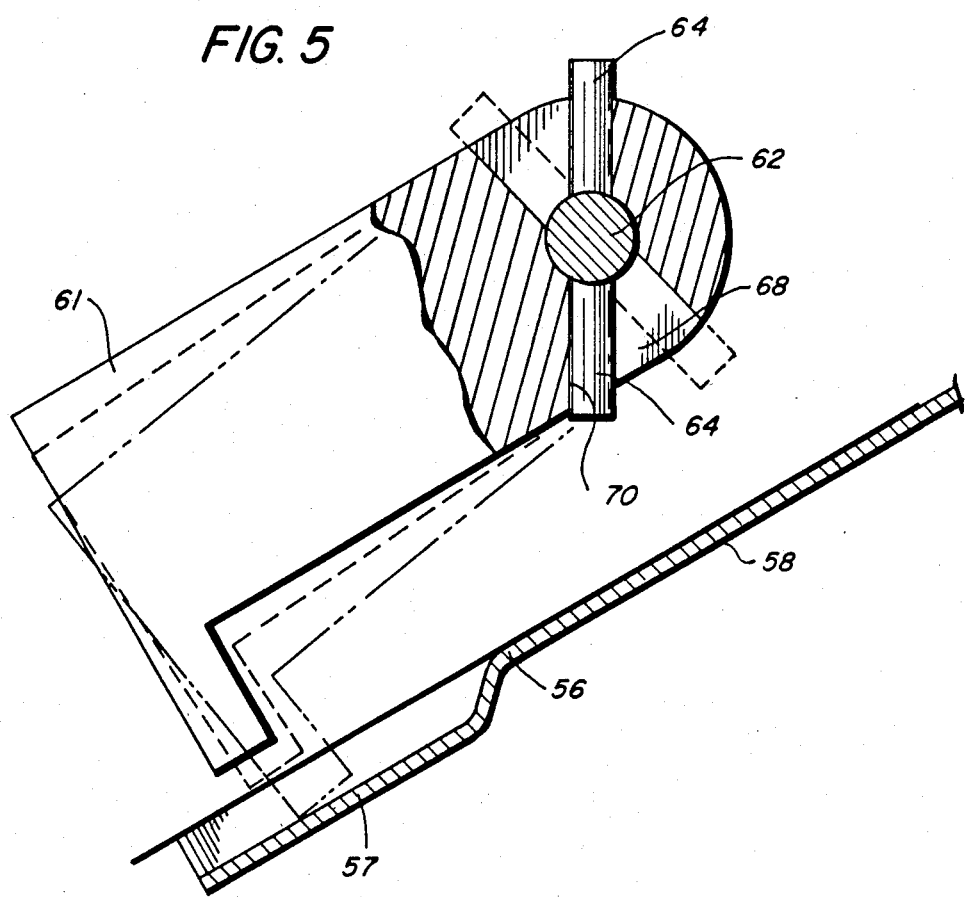
FIG. 5 is an enlarged side view of the gate on a shaft showing the mechanism which permits the floating gate.
Figure 6:
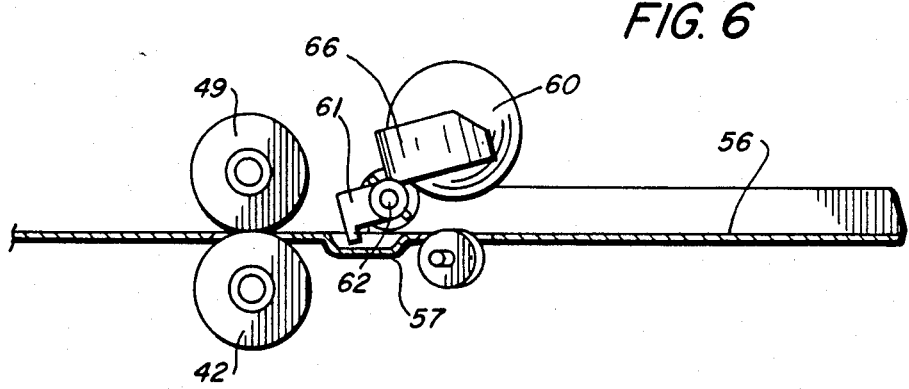
FIG. 6 is a side sectional view of an alternative embodiment of the present invention wherein the sheet loading chute is substantially horizontally oriented.

The mechanism to permit the gate to float on a sheet which is being fed from the inclined stacking chute is illustrated in FIG. 5. The gate 61 which is mounted to gate shaft 62 is positively driven clockwise when the shaft 62 is rotated clockwise by the action of solenoid 63 through linkage 65. The shaft pin 64 extends through the center of shaft 62 and contacts the pin surface 70 of gate to rotate the gate clockwise up out of the path. When it is desired to close the gate, the shaft is rotated counterclockwise and the gate is permitted to fall by gravity and float against the surface with which it comes in contact. This happens because the pin 64 extend through the gate shaft into a very large arcuate pin opening 68 in the gate member itself.

Positioned in the middle of sheet support bottom 58 is start sensor 71 which is activated by inserting a sheet in the chute. Once activated the start sensor activates the registration aid device and since the gate is open the sheet is simultaneously registered and fed in a forward direction.

The action of the gate and registration aid permit loading and feeding a first document and while the first document is being fed the gate is permitted to float on it. A subsequent document can be loaded in the chute without being put in position to be fed when the first document has cleared the loading chute. In this way, the overlapping of successive documents is avoided and a constant inter document and inter copy gap may be achieved during the routine copying of successive sheets.

The principles of the present invention may be further appreciated by reference to its operation during the several different modes of operation. When making a single copy as the user approaches the machine, the gate is open and the registration aid nip is closed. The first document, when dropped into the loading chute strikes start sensor 71 which activates the registration aid and the transport drive which tends to drive the document against the rear registration edge and forward into the nip of the first pair of transport rolls 42, 49. Since all the transport rolls 42-44 are driven at the same speed and the document is driven across the imaging platen 37 at the same speed, the transport mechanism is frequently referred to in the art as a constant velocity transport. As the leading edge of the first document exits the first set of transport rolls it contacts the registration sensor which activates the paper feeder so that a copy sheet arives at the transfer station synchronized to the image on the drum. After a fixed period of time following the first document striking the start sensor, the solenoid 63 is energized, the gate is released and comes down to float on the top of the trailing portion of the first document and the registration ball 60 is simultaneously retracted from the nip with driver roll 59. It is important to note that these events do not occur until the lead edge of the first document is in the nip of the first set of transport rolls 42, 49. Thereafter the first document is transported across the imaging platen and eventually into the document restack tray. If only one document is to be fed and only one copy is made prior to machine shut down the solenoid is deenergized, the gate is open and simultaneously the registration aid roll nip is closed.

In the stream feeding mode of operation following the feeding of the first document as in the single copy mode described above, the gate is floating on the trailing portion of the first sheet and the registration aid nip is open. The second document is manually inserted into the loading chute and falls to the bottom where the lead edge is intercepted by the gate. When the trailing edge of the first document passes the registration sensor, the solenoid is deenergized, the gate retracted and the registration aid ball lowered into contact with driver roll. As with the first document the registration aid registers the document against the rear registration edge and drives it forward into the first set of transport rolls and after a fixed period of time, the gate is again closed by energizing the solenoid. In this way the interdocument and thereby the intercopy gap is maintained substantially constant and there is no possibility of successive documents overlapping.

In the multicopy mode of operation, the desired number of copies is selected on the machine control panel and the copier is placed in the multicopy mode of operation. The first copy is made in the same manner as described with reference to making a single copy except that after a given period of time has elapsed following the passage of the trailing edge past the registration sensor, the direction of all the transport rolls 42-45 is simultaneously reversed and the document is driven straight back in a substantially horizontal path past the loading chute exit to the horizontal transport. It should be noted that since the first document is not driven up the loading chute that the loading chute may be supplied with the next document thereby reducing the total time to make copies and increasing operator convenience. After the lead edge of the document which is being driven in a reverse direction is sensed by the registration sensor, the direction of all the drive rolls 42-45 is again reversed and the document is fed forward past the imaging platen to make a second copy. In this way successive copies of the same document may be made. After the last copy of the document is made the document is transported forward to the restack tray and as the trail edge of the first document passes the registration sensor the next document is released from the loading chute and fed forward in the manner described with respect to stream feeding. This also enables the machine to have a stream feeding multicopy mode of operation.

For copying pages of a book, the upper frame portion is raised up exposing the imaging platen and only the lower transport rolls 42–45. The opened book is manually placed on the substantially horizontal transport plane near drive roll 44 and manually pushed forward. The transport rolls are not being driven at this time. The transport roll 44 has a one way clutch 47 so it can free wheel in the counterclockwise direction as the operator pushes the book forward. When the lead edge of the book reaches the sensor 54, the drive rolls 42–45 are activated and if the operator manually holds the book down or presses slightly on the book so that the book contacts the drive rolls, the drive rolls will drive the book forward over the imaging platen at the proper speed. While the above procedure is repeated for each copy made from a book it should be noted that in an alternative embodiment the transport rolls 42–45 could be arranged to drive the book in a reverse direction after the first copy has been made in preparation for making a second copy in much the same way as described with reference to the multicopy mode of operation described above.

With reference to the above modes of operation it will be understood that as with any automatic reproducing apparatus all the timed machine operations are activated, inactivated or controlled by a machine controller in conventional manner such as is schematically illustrated in As may be appreciated from the above description the present invention provides a compact multimode document handler and a automatic reproducing apparatus containing such a document hander. It is very convenient for the user in each of the modes of operation and is simple in design and comparatively inexpensive to manufacture. It is particularly convenient in permitting the user to merely drop a document in a loading chute and have the machine automatically register and feed the document at the proper time. It is also convenient in that it does not require the user to raise a platen cover and place the document to be copied under the cover. In simple terms it provides a multimode capability with minimal operator interaction. It has the advantage of providing apparatus which does not overlap successive documents during copying and providing a semiautomatic document feed to the imaging platen. It also has the advantage of maintaining a substantially constant interdocument or intercopy gap.

While the invention has been described with reference to the specific embodiment illustrated it will be apparent to those skilled in the art that many alternatives, modification or variations may be made by those skilled in the art. For example, while the invention has been described with reference to a document feeder it has general application to the feeding of any type of sheet material which would include for example, the feeding of copy sheets in an automatic reproducing machine. Accordingly, it is intended to embrace all such alternatives and modifications as may fall within the spirit and scope of the appended claims.

We claim:

1. A multimode document handling apparatus comprising an upper frame portion pivotally mounted along its rear edge to a lower base frame portion to thereby provide open and closed positions of said upper frame portion relative to said lower base frame portion, said lower base frame portion comprising a substantially horizontal imaging platen over which a document to be reproduced may be transported, document transport means to transport a document in a forward direction over said imaging platen, means to reverse the direction of document transport, means to transport a document in a reverse direction back across said imaging platen preparatory to again being transported in a forward direction across said imaging platen to make an additional copy of said document, said upper frame portion comprising a document loading chute which when said upper frame portion is in the closed position is inclined to the horizontal, the lower exit portion of said chute being in operative communication with said means to transport a document over said imaging platen and positioned upstream of said imaging platen, said document loading chute including gate means to permit loading a subsequent document in the chute preparatory to copying while preventing it from being fed while the preceeding document is being copied whereby said apparatus provides multimode reproducing capabilities including the making of multiple copies of a document by transporting the document forward across the imaging platen, reversing the direction and transporting the document back across the imaging platen preparatory to being transported in a forward direction across the imaging platen to make a subsequent copy; stream feeding of successive documents without a subsequent document overlapping a previous document and the capability to copy from a book when said upper frame portion is in the open position by placing a book on the document transport and manually applying sufficient pressure to the book so that the document transport transports the book across the imaging platen.

2. The document handling apparatus of claim 1 wherein said transport means in said lower base frame portion comprises a plurality of driveable transport rolls in the plane defined by said substantially horizontal imaging platen.

3. the document handling apparatus of claim 2 wherein drivable transport rolls are positioned on both sides of said imaging platen and are positioned opposite to and in operative communication with idler rolls in said upper frame portion when said upper frame portion is in the closed position.

4. The document handling apparatus of claim 3 wherein the exit portion of said inclined chute intersects the platen transport plane upstream of the transport rolls on the upstream side of the imaging platen and further including a driveable feed roll in said lower base frame portion upstream of the intersection of the inclined chute and the platen transport plane and a drivable feed roll downstream of the feed roll on the downstream side of the imaging platen.

5. The document handling apparatus of claim 3 wherein said document loading said chute has a side registration aid comprising a driver roll the top of which is in the plane of the chute which is engagable with a top idler ball to form a nip through which a sheet may be fed and side registered, said driver roll being inclined to the general direction of travel of a sheet to thereby drive the rear edge of a sheet against a registration edge.

6. The document handling apparatus of claim 5 including means to retract said gate means from the path of a sheet being fed in said chute simultaneously with engaging the top idler ball of the registration aid with the driver roll.

7. The document handling apparatus of claim 6 including start sensor means in said inclined chute upstream of said registration aid, said sensor being activated by a sheet fed into said chute to in turn activate the registration aid drive roll.

8. The document handling apparatus of claim 7 including means to drive said gate means into the closed position and simultaneously withdrawing the top idler ball from the driver roll after the lead edge of the sheet being fed is in the nip formed by the feed roll upstream of the imaging platen whereby said gate means rests on the back of the sheet being fed and in blocking relationship to any subsquent sheet inserted in the chute.

9. The document handling apparatus of claim 3 including a registration sensor upstream of the imaging platen which senses the trailing edge of a sheet being fed, means responsive to sensing the trailing edge of a sheet being fed to retract the chute gate simultaneously activating the registration drive roll and engaging it with the idler ball.

10. The document handling apparatus of claim 9 including means to reverse the direction of rotation of the transport rolls in response to sensing the trail edge of the document passing the registration sensor whereby the direction of the document is reversed after it has passed the imaging platen and it is transported back beneath the chute exit portion in the plane of the imaging platen, said registration sensor sensing the lead edge of the document being transported in a reverse direction and means responsive to sensing the lead edge of the document to again reverse the direction of rotation of the transport roll so that they now feed in the forward direction.

11. The document handling apparatus of claim 10 further including a driven transport roll upstream of the inclined chute exit into the plane of the imaging platen said transport roll having a one way clutch so that it may freewheel in the feeding direction, and further including sensing means adjacent said roll upstream of the inclined chute to sense the presence of a book and activate the drive roll to feed the book in the forward direction toward the imaging platen with the application of manual pressure to hold the book in contact with drive rolls in the transport path.

12. A reproducing apparatus comprising an upper frame portion pivotally mounted along its rear edge to a lower base frame portion to thereby provide open and closed positions of said upper frame portion relative to said lower base frame portion; said lower base frame portion comprising copier means for forming a fixed toner image on a copy sheet, said copier means comprising an imaging platen over which a document to be reproduced may be transported, document transport means to transport a document in a forward direction over said imaging platen, means to reverse the direction of document transport, means to transport a document in a reverse direction back across said imaging platen preparatory to again being transported in a forward direction across said imaging platen to make an additional copy of said document, said upper frame portion comprising a document loading chute which when said upper frame portion is in the closed position is inclined to the horizontal, the lower exit portion of said chute being in operative communication with said means to transport a document over said imaging platen and positioned upstream of said imaging platen, said document loading chute including gate means to permit loading a subsequent document in the chute preparatory to copying while preventing it from being fed while the preceding document is being copied whereby said apparatus provides multimode reproducing capabilities including the making of multiple copies of a document by transporting the document forward across the imaging platen, reversing the direction and transporting the document back across the imaging platen preparatory to being transported in a forward direction across the imaging platen to make a subsequent copy; stream feeding of successive documents without a subsequent document overlapping a previous document and the capability to copy from books when said upper frame portion is in the open position by placing a book on the document transport and manually applying sufficient pressure to the book that the document transport transports the book across the imaging platen.

13. A reproducing apparatus of claim 12 wherein said copier means comprises a photoconductive insulating layer, means to uniformly charge said photoconductive insulating layer, means to expose said layer to a document on said imaging platen to form an electrostatic latent image on said photoconductive layer, means to develop said electrostatic latent image with toner, means to transfer said toner image to a copy sheet and means to fix said toner image to said copy sheet.

14. The reproducing apparatus of claim 12 wherein said transport means in said lower base frame portion comprises a plurality of driveable transport rolls in the plane defined by said substantially horizontal imaging platen.

15. The reproducing apparatus of claim 14 wherein driveable transport rolls are positioned on both sides of said imaging platen and are positioned opposite to and in operative communication with idler rolls in said upper frame portion when said top frame portion is in the closed position.

16. The reproducing apparatus of claim 15 wherein the exit portion of said inclined chute intersects the platen transport plane upstream of the transport rolls on the upstream side of the imaging platen and further including a driveable feed roll in said lower base frame portion upstream of the intersection of the inclined chute and the platen transport plane and a driveable feed roll downstream of the feed roll on the downstream side of the imaging platen.

17. The reproducing apparatus of claim 15 wherein said document loading chute has a side registration aid comprising a driver roll the top of which is in the plane of the chute which is engagable with a top idler ball to form a nip through which a sheet may be fed and side registered, said driver roll being inclined to the general direction of travel of a sheet to thereby drive the rear edge of a sheet against a registration edge.

18. The reproducing apparatus of claim 17 including means to retract said gate means from the path of a sheet being fed in said chute simultaneously with engaging the top idler ball of the registration aid with the driver roll.

19. The reproducing apparatus of claim 18 including start sensor means in said inclined chute upstream of said registration aid, said sensor being activated by a sheet fed into said chute to in turn activate the registration aid drive roll.

20. The reproducing apparatus of claim 19 including means to drive said gate means into the closed position and simultaneously withdrawing the top idler ball from the driver roll after the lead edge of the sheet being fed is in the nip formed by the feed roll upstream of the imaging platen whereby said gate means rests on the back of the sheet being fed and in blocking relationshp to any subsequent sheet inserted in the chute.

21. The reproducing apparatus of claim 14 including a registration sensor upstream of the imaging platen which senses the leading edge of a document being fed, means responsive to sensing said leading edge of a document being fed to activate a copy sheet feeder in the lower base frame portion of said reproducing apparatus and feed a copy sheet to said transfer means said registration sensor sensing the trailing edge of a sheet being fed, means responsive to sensing the trailing edge of a sheet being fed to retract the chute gate simultaneously activating the registration drive roll and engaging it with the idler ball.

22. The reproducing apparatus of claim 21 including means to reverse the direction of rotation of the transport rolls in response to sensing the trail edge of the document passing the registration sensor whereby the direction of the document is reversed after it has passed the imaging platen and it is transported back beneath the chute exit portion in the plane of the imaging platen, said registration sensor sensing the lead edge of the document being transported in a reverse direction and means responsive to sensing the lead edge of the document to again reverse the direction of rotation of the transport roll so that they now feed in the forward direction.

23. The reproducing apparatus of claim 22 further including a driven transport roll upstream of the inclined chute exit into the plane of the imaging platen said transport roll having a one way clutch so that it may freewheel in the feeding direction, and further including sensing means adjacent said roll pair upstream of the inclined chute to sense the presence of a book and activate the driver roll to feed the book in the forward direction toward the imaging platen with the application of manual pressure to hold the book in contact with drive rolls in the transport path.

* * * * *